Figure 1:
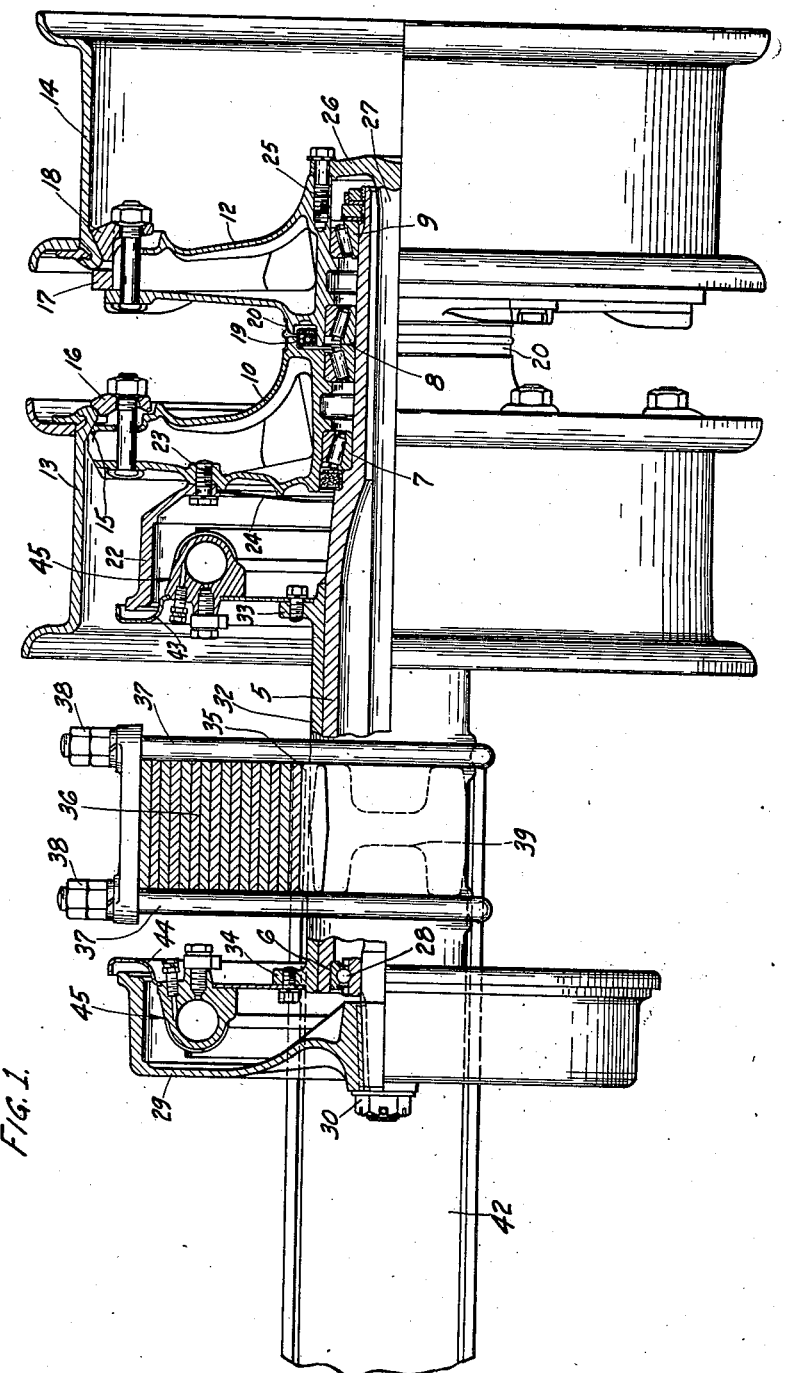

Dec. 16, 1941.                B. L. MILLS                2,266,061
                             AXLE ASSEMBLY
                         Filed May 6, 1939          2 Sheets-Sheet 1

INVENTOR
BURTON L. MILLS.
BY Walter E. Schirmer
ATTORNEY

Dec. 16, 1941.　　　B. L. MILLS　　　2,266,061
AXLE ASSEMBLY
Filed May 6, 1939　　　2 Sheets-Sheet 2

INVENTOR
BURTON L. MILLS.
BY Walter E. Schirmer
ATTORNEY

Patented Dec. 16, 1941

2,266,061

UNITED STATES PATENT OFFICE 2,266,061

AXLE ASSEMBLY

Burton L. Mills, Buchanan, Mich., assignor to Clark Equipment Company, Buchanan, Mich., a corporation of Michigan Application May 6, 1939, Serial No. 272,985

15 Claims. (Cl. 301—1)

This invention is directed to axle assemblies, and more particularly is directed to an axle assembly for dead axles, such as used in trailers, semi-trailers, and the like.

It has been found that there is considerable scuffing of tires on dual wheel axle assemblies on large trailers and the like caused by variations in the turning radii of the individual wheels which results in the inner wheel of the turning arc rotating slower than the outer wheel.

As the two wheels are locked against rotation, there is a consequent scuffing of the tires which produces undue wear, as well as increasing the force required in turning.

The present invention contemplates broadly the provision of two independent wheel bodies mounted on the end of the axle for relative rotation so that a differential movement therebetween is provided during turning, or in cases where the tread diameter of the tires varies so that one wheel rolls on a smaller circle than the other. The inboard wheel of the assembly is provided with a brake drum rigidly secured thereto in order to transmit braking torque to this wheel. Since the two wheels are independently rotatable, some means must be provided for applying a similar braking torque to the outboard wheel in order to prevent unequal wear of the wheels caused by the braking.

In the present invention this is accomplished by using a stub axle arm of tubular form through which extends a shaft having a flanged end secured to the hub of the outboard wheel. At the opposite end this shaft is journalled in the inner end of the tubular axle, and carries a brake drum which is rotatable with the outboard wheel. A suitable spring pad casting is pressed over the tubular arm between the inboard wheel and the inner end of the shaft, and has flanges at its opposite ends which carry backing plates cooperating with the respective brake drums on opposite sides of the spring journal. These backing plates carry the braking mechanism engageable with the respective drums for applying braking force to both of the wheels simultaneously.

In order to provide a rigid axle structure the spring pad casting is provided with one or more normally extending projections and the two stub axle arms are spaced apart by means of structural members secured to the projecting ends of these extensions. These structural members may comprise channels, tubes, or the like, and form a rigid connection between the two axle arms between the spring pads. If desired, oppositely extending extensions can be provided on the arms so that two such structural members may extend transversely beneath the chassis of the trailer in longitudinally spaced relation and outside of the peripheral limits of the inner brake drum.

Another feature of the present invention resides in an assembly in which the wheel shafts at opposite sides of the vehicle are so connected as to provide a knee action suspension.

It is therefore a primary object of the present invention to provide an axle assembly in which the dual wheels are independently rotatable, but may be simultaneously braked by means of individual brake drums connected to each of the wheels.

A still further object of the present invention is to provide a compensating wheel assembly in which the inboard wheel body has its brake drum disposed laterally outwardly of the brake drum for the outboard body with the two brake drums being separated by the spring pad portion of the axle arm.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 1 is a vertical quarter sectional view of an axle assembly embodying the present invention; and Figures 2 to 5 are somewhat diagrammatic plan views illustrating various forms of axle assemblies embodying the invention shown in Figure 1.

Referring now in detail to Figure 1, a suitable axle housing arm is indicated at 5 and comprises a tubular member having an internal bearing portion 6 at its inner end, and having an outer end of reduced section which has bearing seats formed on its outer surface to receive a series of bearings indicated generally at 7, 8 and 9. Two wheel bodies 10 and 12 are provided which may be of any desired form, and in the present disclosure are illustrated as being of the cast spoke type having radially outwardly extending hollow spokes provided with means for mounting the respective tire rims 13 and 14 thereon. The outboard wheel 12 is of smaller diameter than the inboard wheel so as to allow the rim 13 to be passed thereover into position on the beveled seat 15 formed at the spoke ends of the inboard wheel 10 whereby the gutter edge of the rim 13 may be clamped on this seat by means of the lugs 16.

The outboard wheel is provided with a radial shoulder at the spoke ends forming a stop for an annular abutment ring 17 against which the rim 14 engages to be clamped in position by the lugs 18 engaging the gutter edge thereof.

Suitable sealing means are provided between the wheels to prevent the escape of lubricant therepast. This sealing means, indicated at 19, is disposed in axially facing annular recesses formed in the adjacent hubs of the wheels radially outwardly of the bearings 8, and in addition, a suitable closure ring 20 is provided which is snapped over the adjacent peripheral portions of the hubs. This allows the bearings to be lubricated sufficiently and yet prevents the discharge of any of such lubricant outwardly between the wheels without preventing any relative rotation between the wheels caused by turning or the like. Similar sealing means is carried on the housing arm 5 axially inwardly of the bearings 7 to seal the bearing chamber against escape of lubricant axially inwardly between the housing arm and the hub of the wheel spider 10.

The inboard wheel 10 has suitable pilots formed on the inboard side of each of the spokes to which the head flange of a brake drum 22 may be secured by means of the bolts 23. At the same time a suitable brake closure plate 24 may be clamped between the head flange and these pilots to close the brake drum radially inwardly of the bolts 23 about the hub of the wheel body 10.

The outboard wheel spider 12 has its hub portion on the outer face thereof suitably tapped to receive the bolts 25 which secure the flange end 26 of the shaft 27 thereto, this shaft extending through the arm 5 and being journalled at its opposite end on the ball bearings 28 carried in the internal bearing surface 6 of the arm 5. Beyond the bearing support 28 the shaft is provided with a tapered end on which is keyed a brake drum 29 secured to the shaft by means of the lock nut 30. It will be noted that the axle arm 5 terminates at the bearing surface 6, and consequently the brake drum 29 is free to rotate inwardly of the inner end of the arm 5.

Pressed over the arm 5 and suitably secured thereto by means of welding or the like is a sleeve member 32 which may be in the form of a casting having radially directed flanges 33 and 34 at its opposite ends and having an intermediate spring pad portion 35 on which is mounted the leaf spring assembly 36 secured thereto by means of the U-bolts 37 and the nuts 38. This spring at its opposite ends is shackled to the trailer body, and thereby resiliently supports the trailer body upon the axle arm 5.

Extending rearwardly normal to the axis of the sleeve 32 is an integral projection 39 which terminates in a mounting portion 40 to which is secured the transversely extending channel member 42 forming a structural connection between opposite stub axle arms 5. The entire axle assembly therefore comprises the two stub axle arms 5 connected by a laterally offset structural member 42 which is spaced away from the axis of the arms 5 a sufficient distance to clear the periphery of the brake drums 29 carried at the inner ends of the arms 5. The braking torque is therefore imposed upon the wheels by means of the brake drums 22 and 29 at each side thereof, and braking reactions between the two stub axle arms are taken care of by the transverse connecting member 42.

Mounted upon the radial flanges 33 and 34 of the casting 32 are backing plates 43 and 44, respectively, which are thereby secured against rotation and carry any suitable braking mechanism, such as indicated generally at 45, to engage the brake drums 22 and 29 when energized for applying simultaneous braking action to each of the wheels 10 and 12. Thus, while the wheels 10 and 12 are independently rotatable, they are also simultaneously independently braked by means of the braking mechanisms 45 which can be connected to a common actuating source, such as a pressure cylinder, a hydraulic braking system, or a mechanical linkage.

Figure 2:
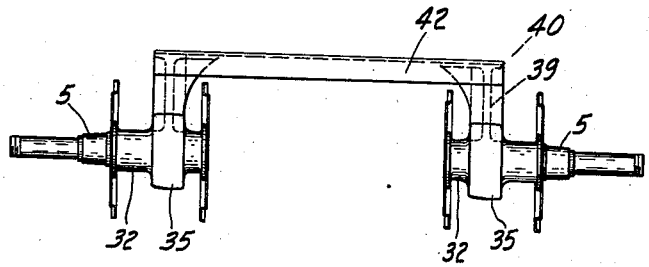
Figure 3:
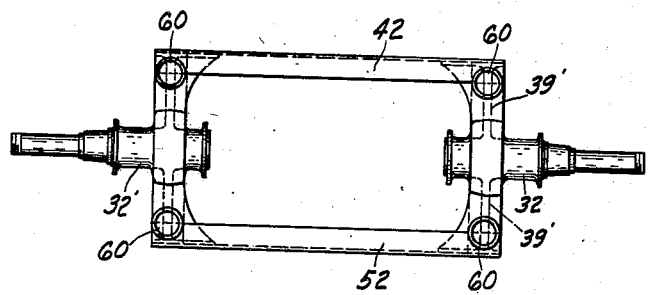
Figure 4:
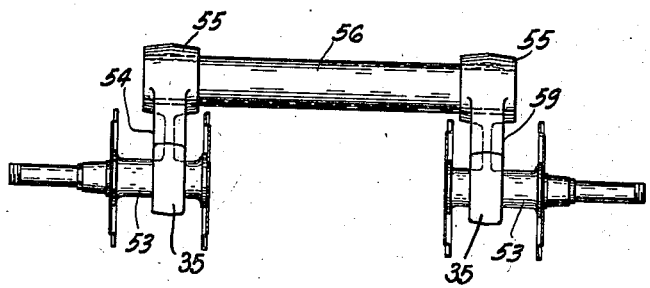

In Figures 2 to 5, inclusive, I have disclosed various connections between the axle assemblies on opposite sides of the vehicle for absorbing the braking reaction and holding the stub axle arms in proper position. The form shown in Figure 2 has already been described, while the form shown in Figure 3 is a variation thereof in which the castings 32' are provided with oppositely extending projections 39' to which are connected the cross members 42 and 52, thus forming a box between the axle arms which is very rigid and is easily able to absorb the braking torque. In Figure 4 a still further modification is provided in which the sleeves 53 corresponding to the sleeves 32 and 32' are provided with integral projections 54 terminating in collar portions 55 adapted to receive the cross tube 56 which is welded or otherwise non-rotatably secured therein. This is similar to the construction shown in Figure 2, but employs a tubular cross member in place of the channel 42.

Figure 5:
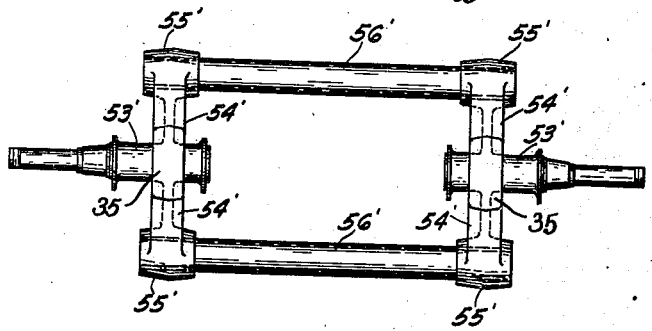

In Figure 5 the sleeves 53' corresponding to the sleeves 53 are provided with opposite projections 54' carrying collar portions 55' at opposite ends thereof in which are engaged the tubular cross members 56' forming a box formation similar to that shown in Figure 3.

Again considering Figure 3, it is apparent that in place of using leaf springs, such as the spring 36 shown in Figure 1, that each corner of the structural box formed between the stub axle arms 5, suitable spring pots such as indicated at 60 may be provided adapted to receive vertically extending coil springs which are suitably anchored at their upper ends to the trailer frame so that quadrilateral coil spring suspension is provided for the vehicle body in place of the elastic leaf spring suspension. This may be desired in connection with certain types of bodies and load requirements, and the present invention adapts itself well to such a spring suspension. In Figures 2, 4 and 5, conventional spring pads 25 are provided, as indicated.

It is therefore apparent that I have provided a novel type of axle assembly for dead axles using compensating independently rotatable wheels which can be simultaneously braked by means of separate braking mechanisms.

I am aware that various changes may be made in certain of the details described and illustrated herein, and I therefore do not intend to be limited except as defined by the scope and spirit of the appended claims.

I claim:

1. A compensating wheel assembly comprising a tubular axle spindle, a pair of wheels independently journalled thereon, a brake drum secured to one wheel, a shaft secured at one end to the other wheel and journalled at the opposite end in said spindle, and a second brake drum secured to the journalled end of said shaft.

2. In combination, a tubular axle spindle, a pair of wheels independently journalled on said spindle, an inboard facing brake drum on the inboard wheel, a shaft connected to the outboard wheel and extending through said spindle, and a brake drum on the inner end of said shaft and facing said first drum.

3. The combination of claim 2 further characterized in a spring pad mounting on said spindle on the inboard side of said wheels having means on opposite sides thereof supporting backing plates for closing said drums.

4. In combination, a tubular spindle having a reduced end portion, a pair of wheels independently journalled on said end portion, a shaft connected to the outermost wheel and extending through said tubular spindle, a brake drum secured to the inboard side of the inboard wheel, and a brake drum secured to the inner end of said spindle axially inwardly of said tubular shaft.

5. In combination, an axle assembly comprising two tubular spindles arranged in longitudinally spaced alinement, sleeves enclosing the adjacent end portions of said spindles and having radial projections, a rigid member interconnecting said projections to connect said spindles together against relative movement, a pair of wheels independently journalled on the remote ends of each of said spindles, and separate braking means for each wheel disposed in axially spaced relation on opposite sides of said projections, said braking means including backing plates secured to opposite ends of each sleeve.

6. In combination, an axle assembly comprising two tubular spindles arranged in longitudinally spaced alinement, sleeves enclosing the adjacent end portions of said shafts and having lateral projections, a rigid member interconnecting said projections to connect said spindles together against relative movement, a pair of wheels independently journalled on the remote ends of each of said spindles, and separate braking means for each wheel disposed in axially spaced relation on opposite sides of said projections, said sleeves each having spring pad portions intermediate the ends thereof for resiliently supporting a vehicle body thereon.

7. The combination of claim 5 wherein said projections extend normal to said spindles and terminate in cylindrical bosses, and said interconnecting member comprises a tube secured at opposite ends in said bosses.

8. The combination of claim 5 further characterized in that each sleeve has oppositely extending projections and two parallel interconnecting members secured between the corresponding ends of the projections to form a substantially box-like structure.

9. The combination of claim 5 further characterized in that each sleeve has oppositely extending projections with parallel members interconnecting the corresponding ends of the projections, and spring seating means at the end of each projection.

10. In combination, a tubular axle arm, a pair of wheels independently journalled thereon, a spring pad mounted on said arm at one side of said wheels, a brake drum for each wheel disposed on opposite sides of said pad, and means for non-rotatably connecting the remote drum to the wheel disposed farthest from said pad.

11. A spring pad casting for a short tubular axle spindle including a sleeve portion adapted to receive said spindle and having a spring pad intermediate its ends, a short radial flange at each end of said sleeve portion adapted to form brake backing plate supports, and an integral radial projection adjacent the spring pad portion of a length greater than the radius of the backing plates.

12. In combination, an axle housing having a spring pad thereon, a brake drum on each side of said pad rotatable relative to said housing, a pair of wheels independently journalled on said housing on one side of said pad, means non-rotatably connecting one brake drum to one wheel, and separate means non-rotatably connecting the other brake drum to the other wheel.

13. In combination, a tubular housing, a pair of wheels mounted in side by side relation on one end of said housing for independent rotation, a brake drum connected directly to one of said wheels, a second brake drum spaced axially from said first drum on the same side of said wheels and disposed adjacent the other end of said housing, and means non-rotatably interconnecting said other wheel and said second drum.

14. In combination, a tubular axle spindle, a wheel rotatably mounted on one end of said spindle, a brake plate mounted at the opposite end of the spindle, means extending through said spindle and secured at one end to said wheel, and a brake drum secured to the opposite end thereof adjacent said plate.

15. In combination, a pair of longitudinally spaced tubular spindles, a wheel rotatably mounted on the outer end of each spindle, a brake plate mounted on the inner end of each spindle, a shaft extending through each spindle and connected at one end to the associated wheel, a brake drum secured to the opposite end of each shaft adjacent said plate, normally extending projections on each spindle intermediate said wheel and brake, and an interconnecting member secured to the ends of said projections.

BURTON L. MILLS.